Figure 1:
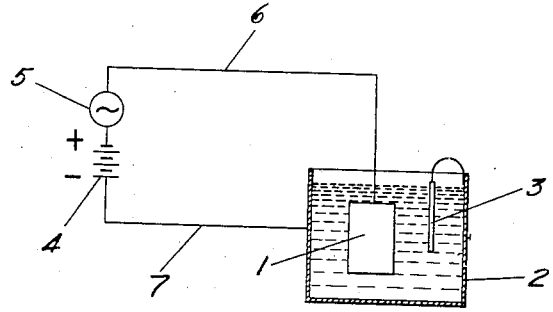

June 20, 1939.                G. K. SZIKLAI                2,163,416
                           ELECTROLYTIC DEVICE
                           Filed April 6, 1936

George K. Sziklai
INVENTOR

BY John J. Rogan
ATTORNEY

Patented June 20, 1939

2,163,416

UNITED STATES PATENT OFFICE 2,163,416

ELECTROLYTIC DEVICE

George K. Sziklai, New York, N. Y., assignor to Electro-Mechanical Research, Inc., Brooklyn, N. Y., a corporation of New York Application April 6, 1936, Serial No. 72,878

1 Claim. (Cl. 175—315)

This invention relates to electrolytic devices and more particularly to improvements in such devices as electrolytic condensers, electrolytic rectifiers, lightening arresters and the like.

In the case of electrolytic condensers there have been proposed two general types, those in which both electrodes are of film-forming metals, and those in which only one of the electrodes is of a film-forming metal. The latter type has the apparent advantage that when the condenser is used in a circuit energized by a polarized alternating or a pulsating current, the overall capacity remains more constant than in the former type. However there are decided drawbacks to the use of condensers of the single film-forming electrode type, not the least of which is the increased cost of manufacturing. Thus the materials that may be employed as the non-filming electrode include copper, iron, chromium and the like. Apart from the difficulty of securing these metals in a sufficiently pure state is the difficulty of preventing their corrosion. Thus to use these metals as an electrode in a condenser it is usually necessary to employ as a co-operating film-forming electrode a metal which is appreciably removed in the electro-chemical series. Thus when the condenser is assembled in the electrolyte there may be generated sufficient current by voltaic action to cause corrosion of either or both electrodes. To over come the last-mentioned disadvantage it has been proposed to make both electrodes of the same metal, however in this case it is a necessary concomitant that both electrodes are film-forming. It has been found however that when an appreciable film forms on the negative electrode the condenser acts very much like two separate condensers connected in series with an overall capacity which is less than a similar condenser with a non-film-forming electrode. I have found that it is possible to make an electrolytic condenser with both electrodes of film-forming metal but without the production of a film of sufficient thickness as to decrease materially the overall capacity of the condenser. As a result of this I am enabled to construct condensers with the most desirable metal for the electrodes such for example as aluminum.

Accordingly one of the principal objects of this invention is to provide an electrolytic condenser, rectifier or the like with a pair of electrodes of film-forming characteristics together with an additional member within the electrolyte to limit the film formation on one of the electrodes.

Another object is to provide an electrolytic condenser, rectifier and the like with a pair of main or condenser electrodes of film-forming metal and an auxiliary electrode of a non-film-forming metal, the last-mentioned electrode acting to limit the film-formation on the main electrode which is normally acting as the negative electrode.

A further object is to provide an electrolytic condenser, rectifier and the like with a pair of main condenser electrodes one of which constitutes an enclosing container of a film-forming metal such as aluminum, tantalum, magnesium and the like, and an auxiliary electrode of a non-film-forming non-corrosive metal such as platinum, stainless steel, chromium plated copper and the like.

A feature of the invention relates to an electrolytic condenser which is particularly well-suited for use in circuits energized by a pulsating current, although it may be employed in any circuit where it is desirable to maintain a maximum capacity stability during the time of application of a pulsating voltage.

A further feature relates to the novel organization, arrangement and relative location of parts which go to make up an improved, economically manufactured, and stable electrolytic condenser or similar electrolytic device.

Other features and advantages not specifically enumerated will be apparent after a consideration of the following detailed descriptions and the appended claim.

While the invention will be described herein in connection with certain specific embodiments, it will be understood that this is done merely for explanatory purposes and not by way of limitation. Accordingly in the drawing, Fig. 1 is a schematic diagram of one embodiment of the invention.

Figure 2:
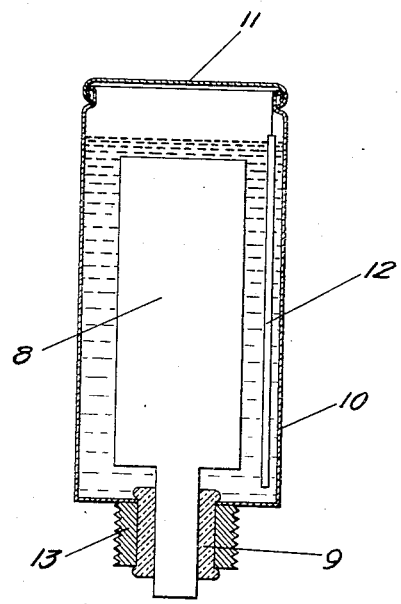

Fig. 2 shows a modified preferred embodiment.

Referring more particularly to Fig. 1 which is a composite schematic diagram showing a typical condenser and circuit used therewith, the condenser comprises an anode 1 of a suitable film-forming metal such as is ordinarily employed in electrolytic devices of this type. Preferably, although not necessarily, the anode 1 is of pure or commercially pure aluminum and is cleaned prior to immersion in the electrolyte in any well-known manner to remove grease and other foreign substances from its surface. The cathode or negative electrode, in accordance with the invention, preferably constitutes the enclosing container or vessel for the electrolyte, and may be of any well-known metal which would normally be capable of forming an insulating film thereon under the action of the electrolyte and a suitable forming potential. While any suitable electrolyte may be employed it is preferred to employ an electrolyte consisting of an aqueous solution of 5% boric acid and 0.2% ammoniumpentaborate.

In accordance with the invention, the container 2 is preferably of the same metal as the anode 1 although the invention is not limited in this respect and any well-known film-forming metal may be used so long as it is not too far removed in the electro-chemical series from the metal of cathode 2. Immersed either wholly or partially within the electrolyte is a third or auxiliary electrode 3 which for convenience may be called the cathanode. Electrode 3 is preferably, although not necessarily, mounted in spaced relation between electrodes 1 and 2 and while the drawing shows the cathanode disposed substantially midway between electrodes 1 and 2 it will be understood that its position with respect to these two electrodes may be varied in any desired manner in accordance with the configuration of the electrodes 1 and 2, and to a certain extent in accordance with the characteristics of the current in the associated circuit, so long as it is in contact with the solution. Thus if the current comprises two components namely a direct component and an alternating or pulsating component relatively small in magnitude with respect to the direct component the cathanode may be disposed relatively close to electrode 2, whereas if the alternating or pulsating component is quite large in comparison with the direct component, the cathanode may be positioned further away from electrode 2. However the spacial position of the cathanode is not critical, and may be varied to suit the electrical and other parameters of the system in which the condenser is used. I have found that if the cathanode 3 is electrically connected with the cathode 2 so as to be at substantially the same potential as the cathode that the formation of an undesirable film on cathode 2 is avoided.

In the drawing the condenser is shown with its anode connected to any well-known source of current represented schematically by the steady source of potential or battery 4 and a variable source 5. It will be understood that this schematic showing of a current source is intended to represent any source having a steady or direct component and a varying or pulsating component such for example as the output of an alternating current rectifier or the like. While I do not wish to be limited to any particular explanation as to how the cathanode when connected as shown, inhibits the formation of an undesirable film on the cathode 2, I believe that it can be explained as follows: Assuming the condenser is of the ordinary two-electrode type and is arranged so that the anode 1 is connected to the positive conductor 6 and cathode 2 is connected to negative conductor 7. So long as the potential applied to the two electrodes is steady, the film on anode 1 remains constant in characteristics and no film is formed on cathode 2, or a film may be formed on the cathode which does not materially affect the resistance or capacity of the condenser. However should the applied potential vary, as for example by the superposition of an alternating or pulsating ripple, then when the steady component of the applied potential is at or approaching its minimum there would be a tendency for the inside surface of the container 2 to form a current blocking film. This tendency would be cumulative and eventually result in the formation of a film on the cathode 2 of sufficient thickness to lower the capacity of the condenser. The provision of the cathanode 3 of non-film-forming and non-corrosive metal maintains substantially constant, and at a relatively low value, the voltage drop between the cathanode and the electrolyte even when the cathanode is at a potential positive with respect to the electrolyte. Since the cathanode is directly connected to the cathode 2, the voltage drop between the surface of the cathode and the electrolyte is likewise kept substantially constant and at a sufficiently low value as to inhibit the formation of a dielectric film on the cathode of sufficient thickness to reduce the overall capacity materially. I have also found that by properly proportioning the area, and spacial disposition of the cathanode 3 with respect to the cathode 2 it is possible to allow an exceedingly thin film to be formed on the cathode, this film acting to protect the cathode from electrolytic corrosion but being insufficiently thick to decrease materially the condenser capacity.

Referring to Fig. 2 a description will now be given of one preferred commercial embodiment of the invention. In this embodiment the anode 8 is of one of the usually employed film-forming metals such as a rod or sheet of pure or commercially pure aluminum which is supported within the container but is insulated therefrom by a suitable insulator bushing 9. The container 10 which constitutes the cathode is also preferably of pure or commercially pure aluminum and both electrodes have their surfaces previously cleaned by any well-known method. The aluminum container is provided with any suitable cover 11 preferably of the same material as the container 10 and while the drawing shows the cover fastened in place in a liquid-tight manner, by its spun-over edge, it will be understood that any well-known manner of fastening the cover may be employed. The cover also carries the cathanode in the form of a wire, rod, or strip 12 of a non-film-forming non-corrosive metal such as platinum, stainless steel, chromium plated copper and the like. The cathanode may have its upper end spun-over on to the corresponding spun-over edge of the cover 11 so that when the cover is applied the cathanode is in the proper relation to the wall of the container and to the anode 8. It will be understood of course that prior to applying the cover the proper quantity of electrolyte is poured into the container. Preferably the cover or other convenient part of the container is provided with a suitable vent (not shown) to allow the escape of gases but without allowing the liquid electrolyte to escape. If desired a threaded nut 13 in electrical contact with the bottom of the container, may be provided to facilitate mounting of the condenser unit. While the drawing shows a cathanode in the form of a single rod, wire or strip disposed on one side of the anode, two or more similar members may be provided so long as they are all in direct conductive relation with the container 10. Furthermore while the invention has been described in connection with a condenser of the liquid electrolyte type, it will be understood that it is equally well applicable to socalled dry or semi-dry type electrolytic devices; electro-dialysis cells, rectifiers, photovoltaic devices and the like.

Various changes and modifications may be made in the embodiments disclosed, without departing from the spirit and scope of the invention, so long as the material of the cathanode is conductive and the electrolyte is chosen so as to inhibit corrosion of the said cathanode.

What I claim is:

An electrolytic condenser for use in connection with a direct current having a pulsating component comprising an anode of a film-forming metal, a cathode of a film-forming metal said cathode also acting as the container for the condenser electrolyte, and a cathanode conductively connected to said cathode, said cathanode being of a non-film-forming metal and inhibiting the formation of a film on said cathode, the joint between said cathanode and said container being disposed outside of said electrolyte.

GEORGE K. SZIKLAI.